United States Patent [19]
Tanaka

[11] Patent Number: 5,309,790
[45] Date of Patent: May 10, 1994

[54] SYSTEM AND METHOD FOR CONTROLLING WORKING HYDRAULIC PRESSURE FOR AUTOMATIC TRANSMISSION WITH FLUID TRANSMISSION DEVICE

[75] Inventor: Yoshikazu Tanaka, Isezaki, Japan

[73] Assignee: Japan Electronic Control Systems Co., Ltd., Isezaki, Japan

[21] Appl. No.: 756,197

[22] Filed: Sep. 9, 1991

[30] Foreign Application Priority Data

Sep. 11, 1990 [JP] Japan ................... 2-239055

[51] Int. Cl.$^5$ ............................ F16H 59/14
[52] U.S. Cl. .................... 74/731.1; 74/733.1; 74/866
[58] Field of Search ............... 74/731.1, 733.1

[56] References Cited

U.S. PATENT DOCUMENTS

| | | | |
|---|---|---|---|
| 4,707,789 | 11/1987 | Downs et al. | 364/424.1 |
| 4,845,618 | 7/1989 | Narita | 364/424.1 |
| 4,875,391 | 10/1989 | Leising et al. | 74/866 |
| 4,936,166 | 6/1990 | Holbrook et al. | 74/733.1 |
| 4,982,620 | 1/1991 | Holbrook et al. | 74/731.1 |
| 4,996,894 | 3/1991 | Holbrook et al. | 74/885 |
| 5,046,383 | 9/1991 | Butts et al. | 74/862 |
| 5,086,670 | 2/1992 | Nitz et al. | 74/866 |
| 5,119,695 | 6/1992 | Milunas et al. | 74/866 |
| 5,151,858 | 9/1992 | Milunas et al. | 364/424.1 |
| 5,157,608 | 10/1992 | Sankpal et al. | 364/424.1 |
| 5,163,342 | 11/1992 | Pollack et al. | 74/866 |
| 5,188,005 | 2/1993 | Sankpal et al. | 74/866 |

FOREIGN PATENT DOCUMENTS

| | | |
|---|---|---|
| 0350018 | 1/1990 | European Pat. Off. |
| 0352803 | 1/1990 | European Pat. Off. |
| 3812673 | 11/1988 | Fed. Rep. of Germany |
| 1-69947 | 5/1989 | Japan |
| 63-290231 | 5/1990 | Japan |

Primary Examiner—Dirk Wright
Attorney, Agent, or Firm—Foley & Lardner

[57] ABSTRACT

A system and method for controlling a working hydraulic pressure supplied to a mechanical power transmission applicable to an automative vehicle, the power transmission having a fluid power transmitting device such as a torque converter, in which a target duration of time during which a shifting operation occurs is retrieved from a table map according to an operating state of the fluid power transmitting device and is compared with an actual duration of time during which the shifting operation occurs. A characteristic value of the fluid power transmitting device is retrieved according to a speed ratio between input and output revolutional speeds of the fluid power transmitting device and is corrected and rewritten according to a magnitude relationship between the target and actual durations of times. An input torque of the mechanical power transmission can, thus, accurately be estimated using the learned characteristic value of the fluid power transmitting device without influence of environmental changes such as a change of altitude and/or variations of the characteristics of the transmission. Consequently, the setting accuracy of the working hydraulic pressure can be improved on the basis of the estimated input torque, thereby the control accuracy of the shifting operation can be improved.

12 Claims, 4 Drawing Sheets

SYSTEM AND METHOD FOR CONTROLLING WORKING HYDRAULIC PRESSURE FOR AUTOMATIC TRANSMISSION WITH FLUID TRANSMISSION DEVICE

BACKGROUND OF THE INVENTION (1) Field of the Invention

The present invention relates to a system and method for controlling a working hydraulic pressure (line pressure) in a mechanical power transmission with a fluid coupling device such as an automatic transmission for an automotive vehicle.

(2) Description of the Background Art

An engine output is input to a mechanical power transmission via a fluid transmitting device such as a torque converter or fluid coupling in an automotive automatic power transmission and no-shift power transmission. Particularly, in the mechanical power transmission device of the automatic transmission, up or downshifting is carried out by means of the engagement or release of a gear shift element such as a clutch or bandbrake.

It is noted that since a gear shift point is generally determined according to an opening angle of a throttle valve and vehicle speed and the engine operating condition is determined according to a kind of gear shift and opening angle of the throttle valve, a working hydraulic pressure is set, estimating the instantaneous engine generated torque, i.e., input torque toward the power transmission.

In addition, in order to improve a gear shift controlling accuracy, a hydraulic pressure controlling system has been proposed in which the hydraulic pressure is learned by detecting a target shifting duration determined according to the opening angle of the throttle valve.

However, since engine generated torque is varied according to the atmospheric pressure (altitude) or the engine state (i.e. warmed-up or not), it is, in some cases, difficult to estimate the engine generated torque on the basis of the opening angle of the throttle valve.

A Japanese Utility Model Registration Application First Publication No. Heisei 1-69947 published on May 10, 1989 exemplifies a line pressure controlling system for the automatic power transmission.

In the disclosed line pressure controlling system, an input revolutional speed and output revolutional speed of the power transmission are compared with each other to derive a speed ratio. An input torque of the mechanical power transmission is estimated on the basis of a characteristic value of a fluid transmitting device (torque converter) derived according to the speed ratio so that the line pressure is controlled on the basis of the estimated input torque.

However, since the fluid transmitting device may have various characteristics according to different types thereof as well as aging effects, it is difficult to accurately estimate the input torque, thus deteriorating the line pressure controlling accuracy.

Furthermore, although another line pressure controlling system in which a torque sensor is installed on an output axle of the power transmission to detect the output torque of the power transmission and the input torque is estimated on the basis of a gear ratio of the mechanical power transmission and the detected output torque, it is not cost effective and requires high precision. Consequently, such a line pressure controlling system as described above has not been put into practice.

SUMMARY OF THE INVENTION

It is, therefore, an object of the present invention to provide a gear shift controlling system and method for a power transmission with a fluid transmitting device in which a characteristic value of a fluid transmitting device is learned, compared with a target shifting duration, to accurately estimate an input torque of a mechanical power transmission, thus increasing accuracy in setting the hydraulic pressure to improve control performance of a gear shift.

The above-described object can be achieved by providing a system for controlling a working hydraulic pressure supplied to a mechanical power transmission of a power transmission applicable to an automotive vehicle, comprising: a) first means for detecting an input revolutional speed of a fluid power transmitting device linked to an output axle of an engine; b) second means for detecting an output revolutional speed of the fluid power transmitting device; c) third means for rewritably storing a characteristic value of the fluid power transmitting device with respect to a speed ratio between the input and output revolutional speeds of the fluid power transmitting device; d) fourth means for detecting an actual duration of time during which a shifting operation occurs; e) fifth means for storing a target duration of time for shifting operation according to an operating state of the fluid power transmitting device; f) sixth means for comparing the target duration retrieved from the fifth means with the actual duration of the shifting operation and correcting and rewriting the characteristic value retrieved from third means on the basis of the comparison result; g) seventh means for estimating an input torque of the mechanical power transmitting device on the basis of the learned characteristic value; and h) eighth means for setting the working hydraulic pressure supplied to the mechanical power transmission on the basis of the estimated input torque.

The above-described object can also be achieved by providing a method for controlling a working fluid hydraulic pressure of a mechanical power transmission applicable to an automotive vehicle in which the power transmission has a fluid power transmitting device, an input axle of the mechanical power transmission being linked to an output axle of the fluid power transmitting device, comprising the steps of: a) detecting an input revolutional speed ($N_E$) of the fluid power transmitting device; b) detecting an output revolutional speed ($N_T$) of an output axle of the fluid power transmitting device; c) detecting an output revolutional speed ($N_M$) of an output axle of the mechanical power transmission; d) determining whether a shifting operation of the mechanical power transmission occurs; e) measuring a duration of time (Ts) of the shifting operation upon determination that a shifting operation occurs; f) retrieving a target duration (To) for shifting operation from a table map according to a speed ratio (e) between the input axle revolutional speed ($N_E$) of the fluid power transmitting device and output axle revolutional speed ($N_T$) thereof and input axle revolutional speed ($N_E$); g) comparing the measured duration of time (Ts) with the target duration of time (To); h) retrieving a characteristic value of the mechanical power transmission from a memory according to a result of comparison; i) correcting the characteristic value according to the result of comparison; j) estimating an input torque of the mechanical power transmission on the basis of the corrected characteristic value and input axle revolutional speed of the fluid power transmitting device; and g) setting a value of the working fluid pressure on the basis of the estimated input torque and speed ratio between the output axle revolutional speed of the fluid power transmitting device and output axle revolutional speed of the mechanical power transmission.

BRIEF DESCRIPTION OF THE DRAWINGS

FIG. 4 (B) is a characteristic graph representing a relationship between a product of the torque ratio and input torque capacity coefficient with respect to the speed ratio.

DETAILED DESCRIPTION OF THE PREFERRED EMBODIMENT

Reference will hereinafter be made to the drawings in order to facilitate a better understanding of the present invention.

Figure 1:
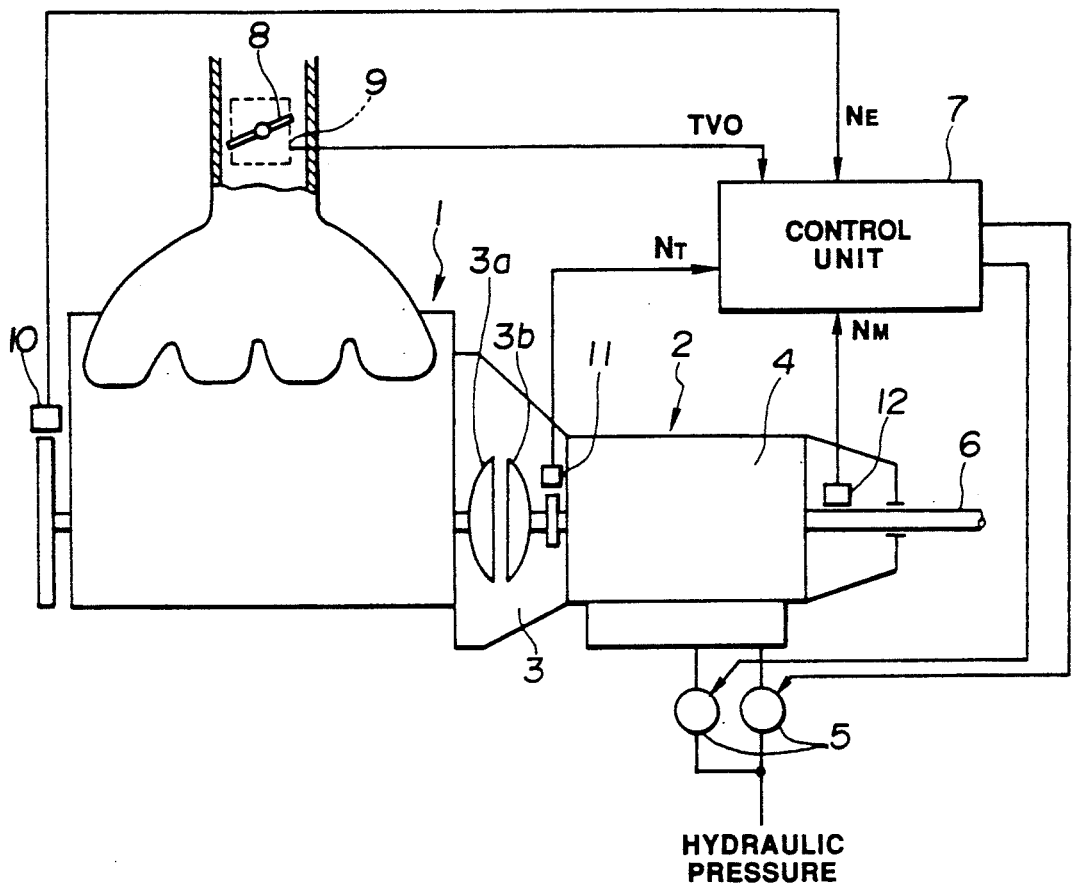
FIG. 1 is a generally circuit block diagram of a gear shift controlling system for an automotive power transmission with a fluid power transmitting device in a preferred embodiment according to the present invention.

FIG. 1 shows a preferred embodiment of a gear shift controlling system according to the present invention.

An automatic power transmission 2 is installed on an output side of an engine 1. The automatic power transmission 2 includes a mechanical power transmitting device (gear type transmission) 4 linked to an output side of the engine 1 via a torque converter 3 having a pump impeller 3a and turbine impeller 3b and electromagnetic valve 5 which controls a working hydraulic pressure for a hydraulic pressure actuator such as a clutch and band brake in the mechanical power transmitting device 4.

In FIG. 1, numeral 6 denotes an output axle of the automatic power transmission 2.

The electromagnetic valve 5 is subjected to a duty ratio control of a control signal supplied thereto from a control unit 7 having a microcomputer and serves to control the gear shift working hydraulic pressure.

The control unit 7 receives sensor signals derived from various types of sensors.

The various types of sensors include a throttle sensor 9 of a potentiometer for detecting an opening angle TVO of a throttle valve 8 installed in an intake air passage of the engine 1.

The sensors also include an engine revolutional speed sensor 10 for detecting an engine revolutional speed $N_E$ on the basis of a revolutional speed of an output axle of the engine 1, i.e., for detecting an input revolutional speed (pump revolutional speed) of the torque converter 3 of the fluid power transmitting device.

A torque converter output revolutional speed sensor 11 is further provided for detecting an output revolutional speed of the torque converter 3 (turbine revolutional speed) $N_T$.

An output axle revolutional speed sensor 12 is provided for detecting an output revolutional speed $N_M$ of the mechanical power transmitting device 4.

Figure 2:
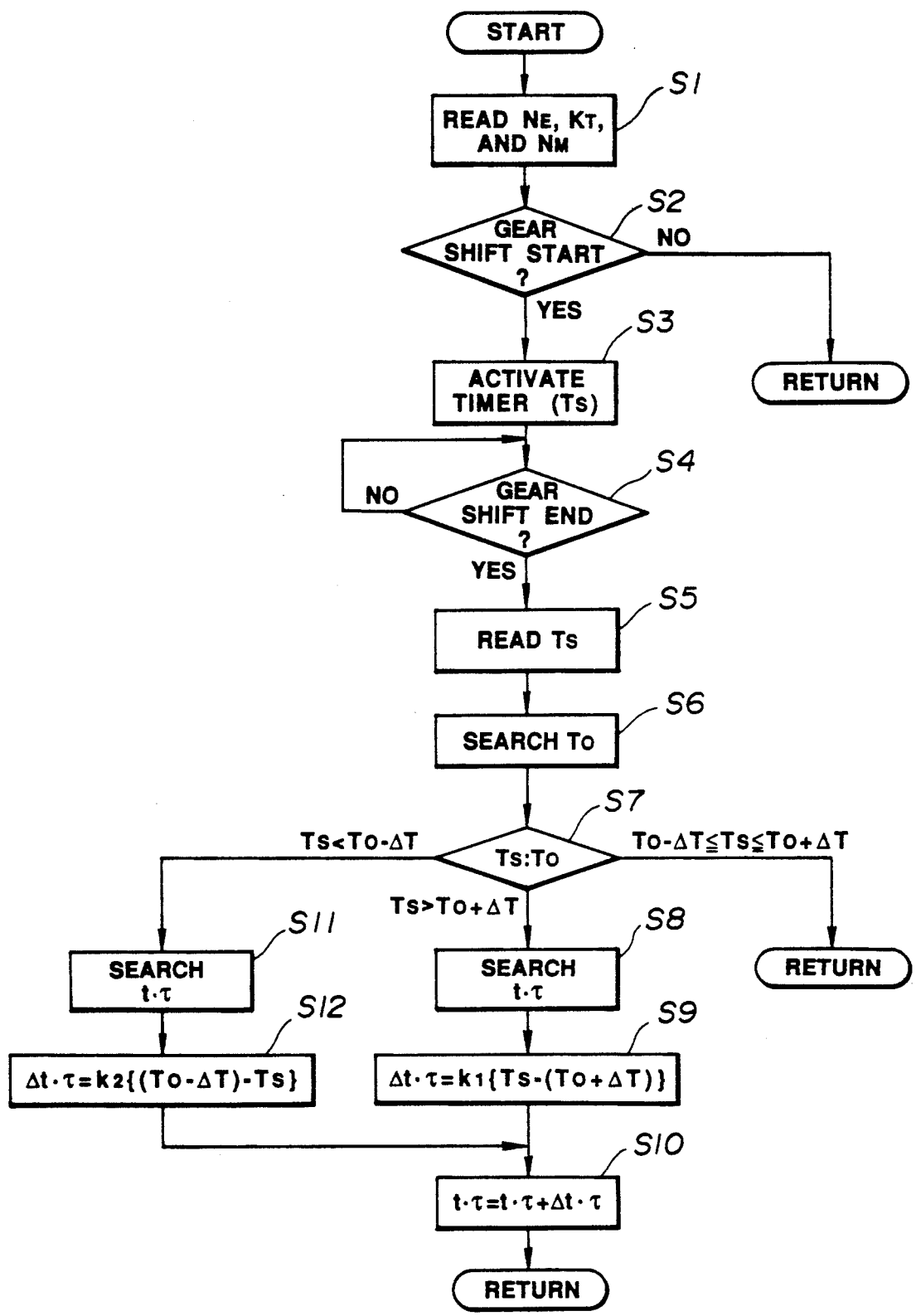
FIG. 2 is an operational flowchart of a characteristic learning routine of a torque converter in the preferred embodiment shown in FIG. 1.
Figure 3:
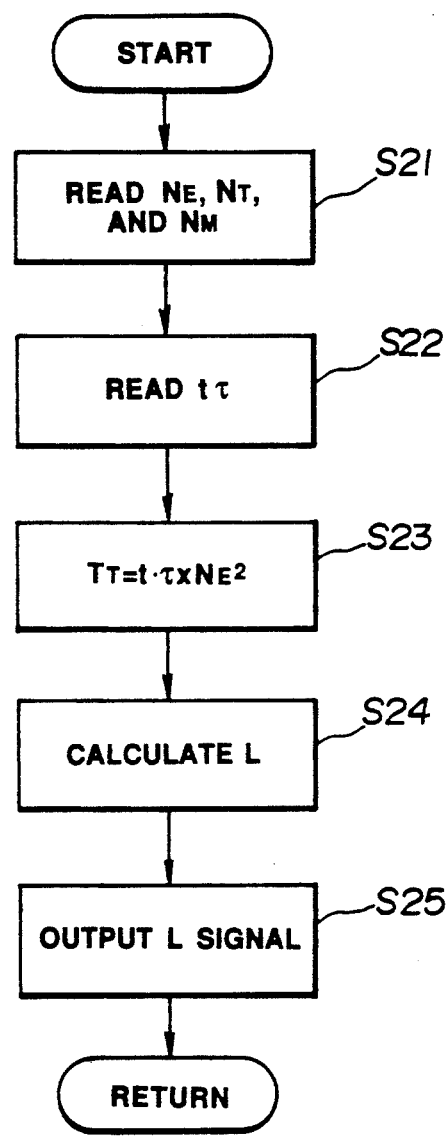
FIG. 3 is an operational flowchart of a working hydraulic pressure control in the preferred embodiment shown in FIG. 1.

The control unit 7 carries out learning of a characteristic value of the torque converter 3 in accordance with an operational flowchart shown in FIG. 2 and carries out a working hydraulic pressure control on the basis of an input torque in accordance with the flowchart shown in FIG. 3.

Referring to FIG. 2, in a step S1, the control unit 7 reads an engine revolutional speed $N_E$, turbine revolutional speed $N_T$, and output axle revolutional speed $N_M$.

In a step S2, the control unit 7 determines start of a shifting operation depending on whether a change rate of a speed ratio $N_T/N_M$ between the turbine revolutional speed $N_T$ and output axle revolutional speed $N_M$ exceeds a predetermined value. The speed ratio is constant according to the gear ratio in a steady state, but is varied according to shifting operation. Therefore, the change rate is used to determine the start of a gear shifting operation.

In a step S3, the control unit 7 resets a timer to measure a time duration of the shifting operation.

In a step S4, the control unit 7 determines an end of the shifting operation depending on whether the change rate of the speed ratio $N_T/N_M$ is less than a predetermined value.

In this case, the speed ratio becomes constant upon end of the shifting operation with the engine in the steady state.

Then, after the end of the shifting operation in step S4, the routine goes to a step S5 in which the shifting duration $T_S$ is measured by reading the value of the timer upon ending of the shifting operation.

In a step S6, the control unit 7 searches a three-dimensional table map stored in a ROM of the microcomputer and retrieves a target shifting duration $T_o$ on the basis of a speed ratio e ($=N_T/N_E$) between the engine revolutional speed $N_E$ and turbine revolutional speed $N_T$.

In a step S7, the control unit 7 compares an actual duration of time $T_S$ measured in a step S5 and a target duration of time $T_o$ determined according to an operating state of the torque converter 3 retrieved in step S6.

Figure 4:
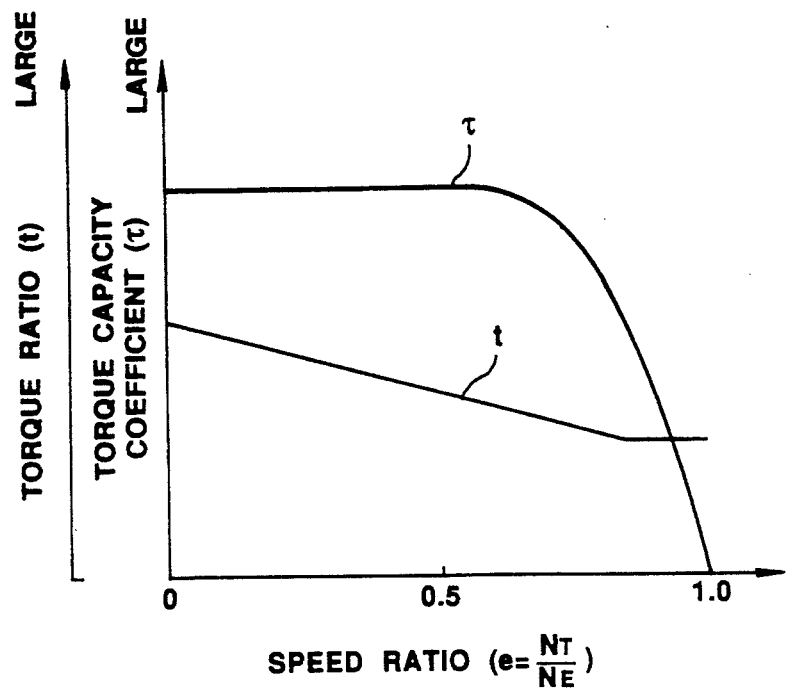
FIG. 4 (A) is a characteristic graph representing a relationship between a torque ratio and input torque capacity coefficient with respect to a speed ratio of a torque converter.
Figure 4:
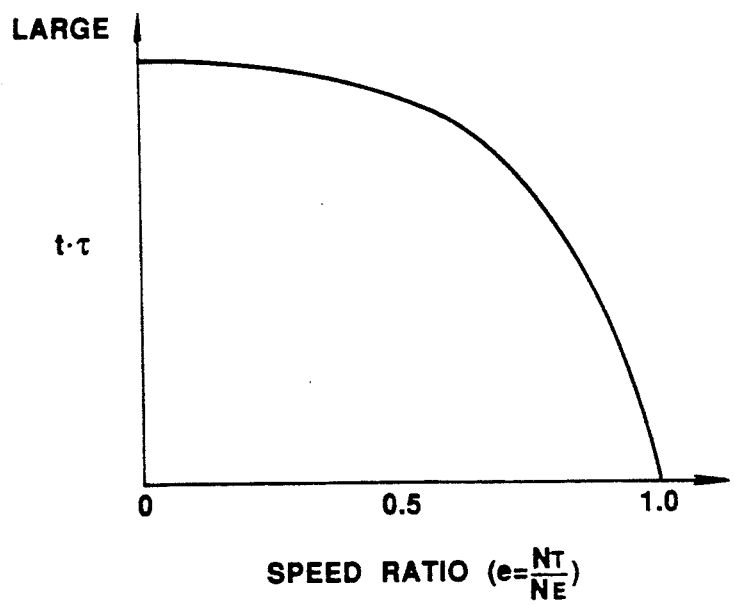

Then, when $T_S > T_o + \Delta T$ ($\Delta T$ denotes a positive predetermined value), the routine goes to a step S8 in which a characteristic value $t \cdot \tau$ of the torque converter 3 constituted by a product between of torque t and input torque capacity coefficient $\tau$ on the basis of the speed ratio e (each characteristic, t, $\tau$, and $t \cdot \tau$ are shown in FIGS. 4 (A) and 4 (B)) is retrieved from a two-dimensional table map stored in a RAM of the microcomputer.

In a step S9, the control unit 7 sets a correction value $\Delta t \cdot \tau$ to correct the characteristic value $t \cdot \tau$ as a value of a difference $\{T_S - (T_o + \Delta T)\}$ between the values $T_S$ and $T_o + \Delta T$ multiplied by a positive proportional constant $K_1$.

In a step S10, the control unit 7 corrects the characteristic value $t \cdot \tau$ by the characteristic value to which the correction value $\Delta t \cdot \tau$ is added to rewrite the $t \cdot \tau$ data in the RAM. That is to say, when the actual duration of time of the shifting operation is larger than the target duration for the shifting operation, that is, the actual duration exceeds a predetermined time, the characteristic value t·τ is corrected in the direction of increase in order to approach the target duration. This causes the input torque value $T_T$, derived from an arithmetic operation equation as will be described later using the characteristic value t·τ, to be increased so that the working hydraulic pressure L set on the basis of the input torque $T_T$ is increased, thus the target duration for the shifting operation being shortened.

Alternatively, when $T_S < T_o - \Delta T$ in the step S7, the routine goes to a step S11.

In the step S11, the control unit 7 retrieves the characteristic value t·τ on the basis of the speed ratio e.

In a step S12, the control unit 7 sets the correction value Δt·τ as a difference $\{(T_o - \Delta T) - T_S\}$ between $T_s$ and $T_o - \Delta T$ multiplied by a negative proportional constant $k_2$ and the routine goes to step S10.

In this case, in the step S10, the characteristic value is corrected by the characteristic value t·τ to which the negative correction value Δt·τ is added to rewrite the data t·τ in the RAM. That is to say, when the actual shifting duration is less than the target shifting duration by the predetermined time, the characteristic value t·τ is corrected in the direction of decrease so that the input torque $T_T$ is decreased and the working hydraulic pressure L set on the basis of the input torque $T_T$ is decreased, thus the target duration of time of the shifting operation being increased.

In addition, when $T_o - \Delta T \leq T_s \leq T_o + \Delta T$, the routine is ended without execution of corrective learning of the characteristic value t·τ.

It is noted that although, in the preferred embodiment, only one map of the characteristic value t·τ is prepared, a unalterable map of representative values and/or a rewritable map in which the correction values to be added to the representative values are rewritable may alternatively be provided.

Next, a routine for setting of the working hydraulic pressure, derived using the learned characteristic value t·τ, will be described in accordance with the flowchart of FIG. 3.

In a step S21, the control unit 7 reads the engine revolutional speed $N_E$, turbine revolutional speed $N_T$, and output axle revolutional speed $N_M$.

In a step S22, the control unit 7 reads the characteristic value t·τ according to the speed ratio e ($N_T/N_E$).

In a step S23, the input torque $T_T$ of the mechanical power transmission is estimated on the basis of the characteristic value t·τ and engine revolutional speed $N_E$ using the following equation.

$$T_T = t \cdot \tau \times N_E^2.$$

It is noted that such an estimating method as described above is disclosed in a Japanese Utility Model Registration Application First Publication No. Heisei 1-69947.

In a step S24, the working hydraulic pressure L is calculated on the basis of the estimated input torque $T_T$ and the present shift state, or gear state, derived from the speed ratio ($N_T/N_M$).

The working hydraulic pressure L may be derived by two-dimensional table maps installed for each gear, or shift state.

In a step S25, the working hydraulic pressure is controlled outputting a duty ratio signal whose duty ratio is in accordance with the working hydraulic pressure L calculated in the step S24 to the electromagnetic valve 5.

In the way described above, the input torque of the mechanical power transmission can accurately be detected using the learned characteristic value t·τ while avoiding the influences of environmental change such as vehicle altitude, dispersed characteristic change of the transmission, and aging effects. The hydraulic pressure can therefore be accurately set using the detected input torque.

The present invention is also applicable to a non-shift power transmission having a fluid coupling although in the preferred embodiment the present invention is applicable to an automatic power transmission with torque converter. In this case, since the torque ratio t is 1, the learned characteristic value may merely be the input torque capacity coefficient τ.

As described hereinabove, since in the shift controlling system according to the present invention the target shifting duration is compared with the actual shifting duration during the shifting operation occurrence, the characteristic of the fluid power transmitting device is learned, the input torque of the mechanical power transmission may be estimated with high accuracy using the learned characteristic and the working hydraulic pressure is controlled on the basis of the estimated input torque, the hydraulic pressure is always controlled so as to provide an optimum value without influence of changing environmental conditions such as altitude, variation in the characteristics of the power transmission, and/or aging effects. Thus shifting operation control performance can be highly improved.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for controlling a working hydraulic pressure supplied to a mechanical power transmission applicable to an automotive vehicle, comprising:
   a) first means for detecting an input revolutional speed of a fluid power transmitting device linked to an output axle of an engine;
   b) second means for detecting an output revolutional speed of the fluid power transmitting device;
   c) third means for rewritably storing a characteristic value of the fluid power transmitting device with respect to a speed ratio between the input and output revolutional speeds of the fluid power transmitting device;
   d) fourth means for detecting an actual duration of time during which a shifting operation occurs;
   e) fifth means for storing a target duration of time during which the shifting operation occurs, according to an operating state of the fluid power transmitting device;
   f) sixth means for comparing the target duration of time during which the shifting operation occurs retrieved from the fifth means with the actual duration of time during which the actual shifting operation occurs and correcting and rewriting the characteristic value retrieved from third means on the basis of the comparison result;
   g) seventh means for estimating an input torque of the mechanical power transmission on the basis of the learned characteristic value; and h) eighth means for setting the working hydraulic pressure supplied to the mechanical power transmission on the basis of the estimated input torque.

2. A system for controlling working hydraulic pressure as set forth in claim 1, wherein said fluid power transmitting device comprises a torque converter and wherein the characteristic value is a torque ratio between an input torque and output torque of the torque converter multiplied by a torque capacity coefficient.

3. A system for controlling working hydraulic pressure as set forth in claim 1, wherein said fluid power transmitting device comprises a fluid coupling and wherein the characteristic value is an input torque capacity coefficient.

4. A system for controlling working hydraulic pressure as set forth in claim 1, wherein said fifth means stores the target duration of time during which the shifting operation occurs according to a speed ratio between the input and output revolutional speeds of the fluid power transmitting device and input revolutional speed of the fluid power transmitting device.

5. A method for controlling a working fluid hydraulic pressure of a mechanical power transmission of a power transmission applicable to an automotive vehicle, the power transmission having a fluid power transmitting device, an input axle of the mechanical power transmission being linked to an output axle of the fluid power transmitting device, comprising the steps of:
   a) detecting an input revolutional speed ($N_E$) of the fluid power transmitting device;
   b) detecting an output revolutional speed ($N_T$) of an output axle of the fluid power transmitting device;
   c) detecting an output revolutional speed ($N_M$) of an output axle of the mechanical power transmission;
   d) determining whether a shifting operation of the mechanical power transmission occurs;
   e) measuring a duration of time (Ts) of the shifting operation upon determination that a shifting operation occurs;
   f) retrieving a target duration of time (To) during which the shifting operation occurs from a table map according to a speed ratio (e) between the input axle revolutional speed ($N_E$) of the fluid power transmitting device and output axle revolutional speed ($N_T$) thereof and input axle revolutional speed ($N_E$);
   g) comparing the measured duration of time (Ts) with the target duration of time (To);
   h) retrieving a characteristic value of the mechanical power transmission from a memory according to a result of comparison;
   i) correcting the characteristic value according to the result of comparison;
   j) estimating an input torque of the mechanical power transmission on the basis of the corrected characteristic value and input axle revolutional speed of the fluid power transmitting device; and
   g) setting a value of the working fluid pressure on the basis of the estimated input torque and speed ratio between the output axle revolutional speed of the fluid power transmitting device and output axle revolutional speed of the mechanical power transmission.

6. A method for controlling a working hydraulic pressure as set forth in claim 5, wherein the fluid power transmitting device comprises a torque converter and wherein the characteristic value is expressed as follows: $t \cdot \tau$, wherein t denotes a torque ratio determined according to the torque converter and $\tau$ denotes an input torque capacity coefficient of the torque converter.

7. A method for controlling a working fluid hydraulic pressure as set forth in claim 6, wherein the characteristic value $t \cdot \tau$ is corrected with a correction value $\Delta t \cdot \tau$ according to the result of comparison as follows: $t \cdot \tau = t \cdot \tau + \Delta t \cdot \tau$ 8. A method for controlling a working fluid hydraulic pressure as set forth in claim 7, wherein the correction value $\Delta t \cdot \tau$ is expressed as follows when $Ts < To - \Delta T$ ($\Delta T$ denotes a positive predetermined value): $\Delta t \cdot \tau = k_2 (To - \Delta T) - Ts$, wherein $k_2$ denotes a positive predetermined value.

9. A method for controlling a working hydraulic pressure as set forth in claim 8, wherein the correction value $\Delta t \cdot \tau$ is expressed as follows when $Ts > To - \Delta T$ ($\Delta T$ denotes a positive predetermined value): $\Delta t \cdot \tau = k_1 \{Ts - (\Delta T + To)\}$, wherein $k_1$ denotes another positive predetermined value.

10. A method for controlling a working hydraulic pressure as set forth in claim 9, wherein the input torque is estimated as follows: $T_T = t \cdot \tau \times N_E^2$.

11. A method for controlling a working hydraulic pressure as set forth in claim 10, wherein the hydraulic pressure L is set on the basis of input torque estimated using the following equation, $T_T = t \cdot \tau \times N_E^2$, and the speed ratio $N_T / N_M$.

12. In an automatic power transmission having fluid power transmitting means connected to an output shaft of an internal combustion engine, mechanical gear shifting means hydraulically controlled, and an electromagnetic valve which controls the operation of hydraulic actuators provided in the mechanical gear shifting means in response to a duty ratio signal from control means,
    said control means comprising:
    a) first means for detecting an input revolution speed of said fluid power transmitting means and outputting a first signal indicative thereof;
    b) second means for detecting an output revolution speed of said fluid power transmitting means and outputting a second signal indicative thereof;
    c) third means for rewritably storing a characteristic value of said fluid power transmitting means with respect to a speed ratio between the input and output revolution speeds detected by said first and second means;
    d) fourth means for detecting an actual duration of time during which a shifting operation occurs;
    e) fifth means for storing a target duration of time during which the shifting operation occurs, according to an operating state of said fluid power transmitting means;
    f) sixth means for comparing the target duration of time retrieved from said fifth means with the actual duration of time detected by the fourth means and correcting and rewriting the characteristic value retrieved from said third means on the basis of the comparison result thereof;
    g) seventh means for estimating an input torque of the mechanical gear shifting means on the basis of the first and second signals and on the basis of the learned characteristic value of said fluid power transmitting means; and
    h) eighth means for controlling the duty ratio of the signal transmitted to the electromagnetic valve according to the estimated input torque of said mechanical gear shifting means so that the hydraulic pressure supplied to said hydraulic controlled actuators including the clutch means, frictional elements, and actuator valves of the mechanical gear shifting means is adjusted and set.

* * * * *